United States Patent [19]

Nagate et al.

[11] Patent Number: 5,720,847
[45] Date of Patent: Feb. 24, 1998

[54] LAMINATOR FOR LAMINATING FILM SHEET ON SUBSTRATE

[75] Inventors: Hiroshi Nagate; Kenichi Miyata; Hiroya Endo, all of Shizuoka; Yoji Washizaki, Tokyo, all of Japan

[73] Assignees: Fuji Photo Film Co., Ltd., Kanagawa; Somar Corporation, Tokyo, both of Japan

[21] Appl. No.: 697,245

[22] Filed: Aug. 21, 1996

[30] Foreign Application Priority Data

Aug. 21, 1995 [JP] Japan .................. 7-236220

[51] Int. Cl.$^6$ .................................. B32B 31/10
[52] U.S. Cl. .................. 156/497; 156/522; 156/555; 156/556; 156/583.1
[58] Field of Search .................. 156/497, 511, 156/517, 521, 522, 555, 556, 580, 582, 583.1

[56] References Cited

U.S. PATENT DOCUMENTS

| | | | |
|---|---|---|---|
| 4,025,380 | 5/1977 | Bernardo | 156/355 |
| 4,308,087 | 12/1981 | Johnson | 156/510 |
| 4,585,509 | 4/1986 | Obayashi | 156/497 |
| 4,909,870 | 3/1990 | Gould et al. | 156/66 |
| 4,909,891 | 3/1990 | Sumi et al. | 156/497 |
| 4,964,937 | 10/1990 | Seki | 156/250 |

*Primary Examiner*—James Sells

[57] ABSTRACT

A laminator for laminating a film sheet on a surface of a substrate comprises: a pressure roller; a conveyor roller for supplying a substrate to the pressure roller; a film sheet-supplier which is reciprocally movable up and down for attaching a front end of a continuous flexible film sheet onto the front end of the surface of the substrate which has been moved by the conveyor roller and is stopped in front of the pressure roller; and a film sheet end-holder which is movable forward and backward and has on its front end a gas blowing face having a curve corresponding to the curve of the surface of the pressure roller so as to hold the film sheet in contact with the surface of the pressure roller.

5 Claims, 7 Drawing Sheets

LAMINATOR FOR LAMINATING FILM SHEET ON SUBSTRATE

FIELD OF THE INVENTION

This invention relates to a laminator for laminating a film sheet on a substrate. In more detail, the invention relates to a laminator for uniformly laminating a flexible film sheet such as a colored photo-sensitive resin film on successively supplied substrates having the essentially same size as the film sheet.

BACKGROUND OF THE INVENTION

A color filter is employed for a liquid crystalline panel of an image display device attached to a personal computer or a navigator. The color filter comprises a transparent substrate such as a glass plate or a resin sheet and a great number of small pixels of R (red), G (green) and B (blue) arranged regularly on the substrate. The small pixels can be prepared various processes. According to a recently developed processes, a colored photo-sensitive resin film is laminated on a surface of a transparent substrate by a laminator and then the laminated photo-sensitive resin film is exposed to light through a certain pattern sheet and processed in a developing solution to give a colored film pattern comprising a great number of small pixels.

The process using the colored photo-sensitive resin film is favorably utilized for the preparation of a color filter with high uniformity and without production of missing color areas (i.e., missing pixels). In order to produce the satisfactory color filter, the colored photo-sensitive film sheet should be laminated on the substrate with an extremely uniform surface free from production of wrinkle. However, since the colored photo-sensitive film sheet comprising pigments and a small amount of a resinous binder for keeping the pigments in the film is an extremely thin film of less self-supporting, it is not easy to laminate such thin colored photo-sensitive film sheet over whole surface of a substrate with high uniformity.

Until now, a number of laminators have been developed for laminating such thin photo-sensitive film sheet uniformly on a substrate.

Figure 1:
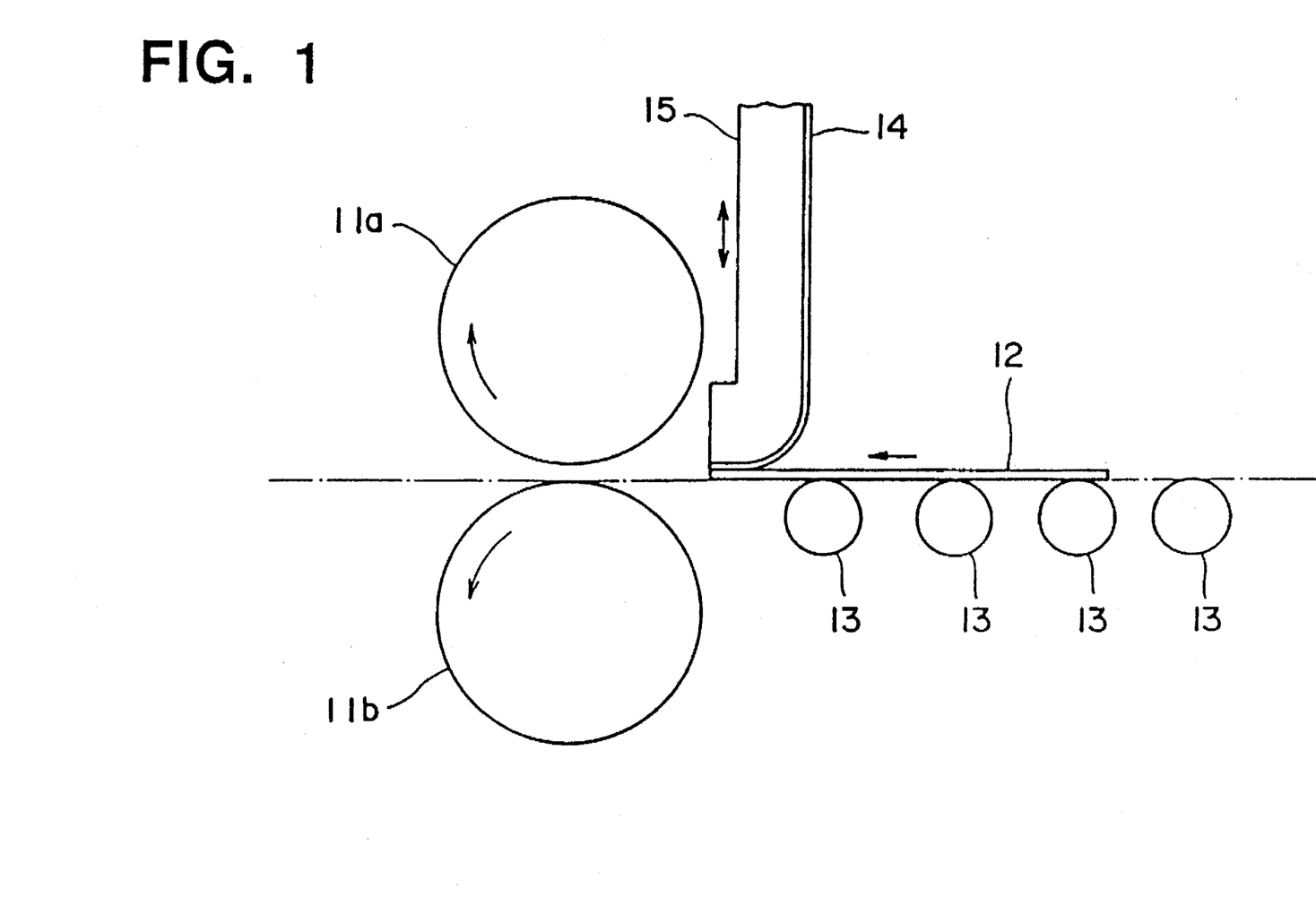
FIG. 1 is a schematic view of one example of known laminators for laminating a film sheet on a substrate.

Japanese Patent Provisional Publication H2-196656 discloses a laminator for laminating a film sheet on a substrate, which is illustrated in FIG. 1 on the attached drawings. The laminator comprises a pair of heated pressure rollers 11a, 11b, a plurality of conveyor rollers 13 for supplying a substrate 12 to the pressure rollers; and a film sheet-supplying means 15 which is reciprocally movable up and down for attaching the front end of a continuous flexible film sheet 14 onto the front end of the surface of the substrate which has been moved by the conveyor rollers and is stopped at the position in front of the pressure rollers.

The film sheet-supplying means 15 is constituted to form a vacuum system in its body and installed to become movable up and down. The substrate 12 (generally, which is beforehand heated to 40°120° C.) is conveyed on the conveyor rollers 13 to approach the heated pressure rollers 11a, 11b and then is stopped in front of the pressure rollers. From the upper position above the stopped substrate 12, the film sheet-supplying means 15 keeping on its bottom end the front end of the continuous film sheet 14 by adsorptive power caused by operation of the vacuum system comes down, and becomes into contact with the front end of the substrate 12 at its bottom end so as to attach the front end of the film sheet 14 onto the front end of the substrate. Thereafter, the operation of vacuum system is ceased and the film sheet-supplying means goes up. The substrate 12 having on its front end the front end of the film sheet 14 advances to reach the entrance of the pressure rollers (i.e., gap between the pair of the rollers), or the pair of the pressure rollers 11a, 11b may advance to receive the substrate between the gap. The substrate 12 passes through the gap between the rollers, thereby the film sheet is laminated on the surface of the substrate.

Figure 2:
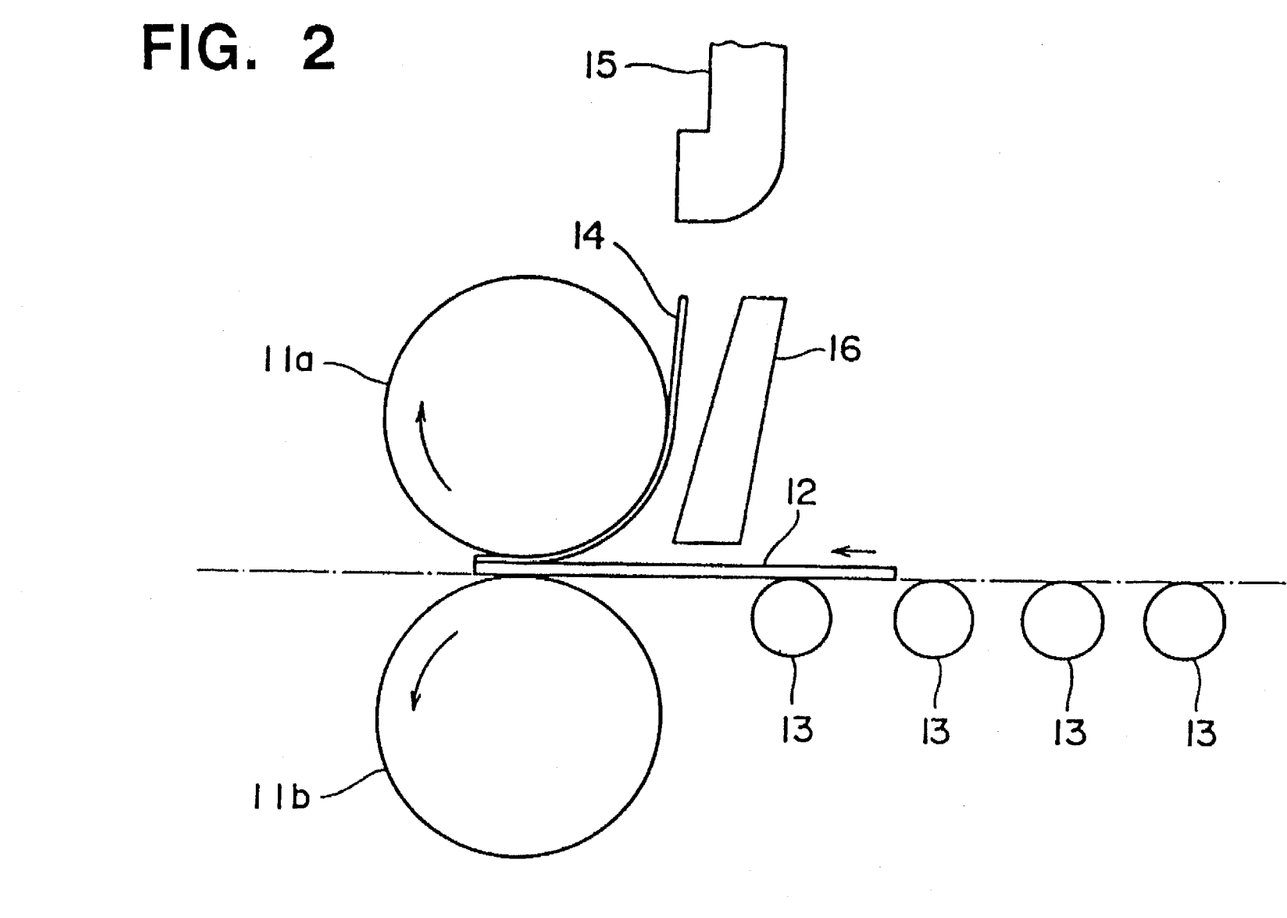
FIG. 2 is a schematic view of one example of known laminators for laminating a film sheet on a substrate, which is equipped with a film sheet rear end-holding
Figure 3:
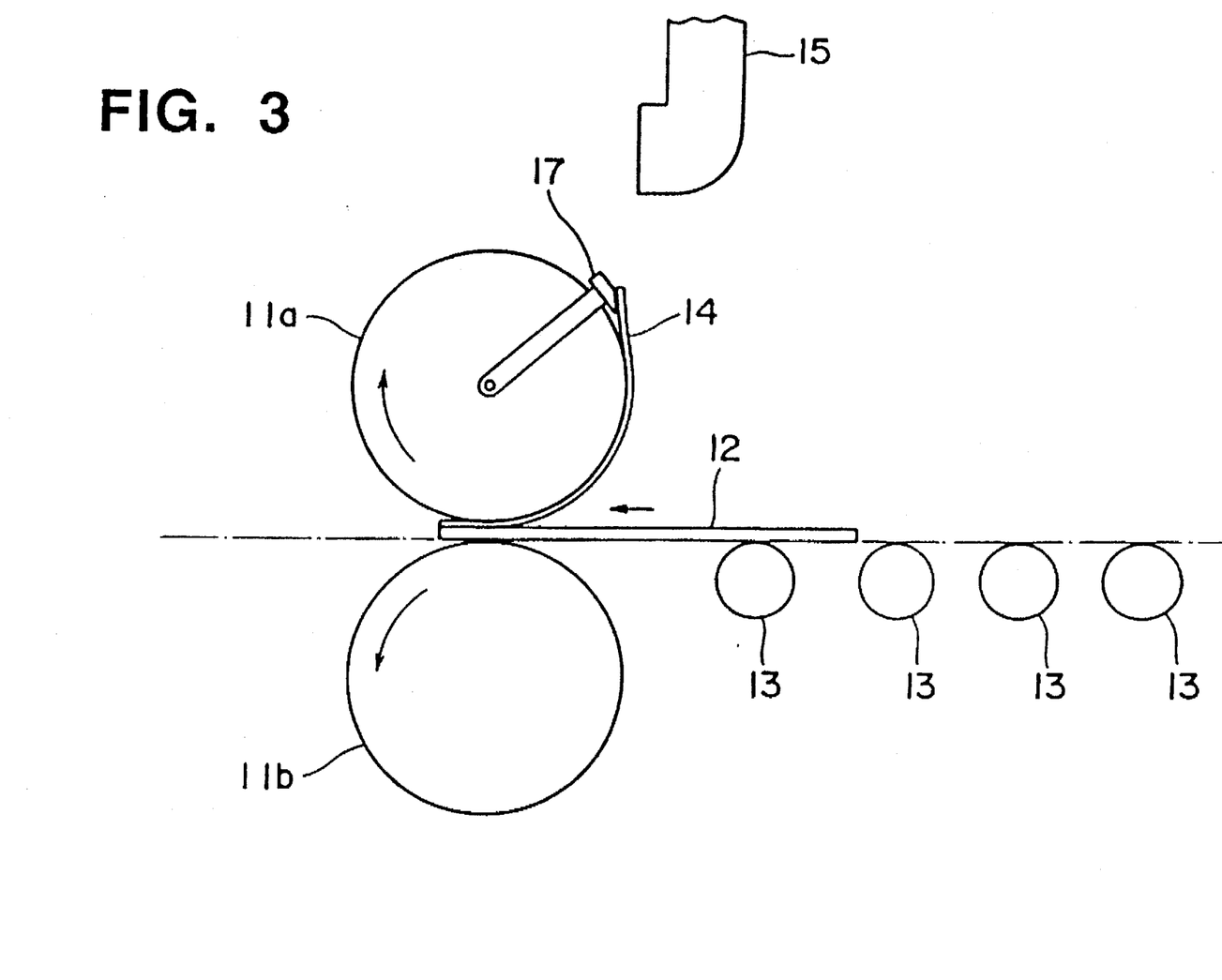
FIG. 3 is a schematic view of one example of known laminators for laminating a film sheet on a substrate, which is equipped with a film sheet rear end-holding means.

In the above-described procedure, the rear end of the film sheet 14 may droop by the action of gravity after the film sheet-supplying means goes up and the film sheet is cut off. Therefore, it is required to provide a means for keeping the film sheet in contact with the pressure roller with no drooping. The laminator illustrated in the publication is provided with a gas blowing means in the form of a nozzle plate 16 (see FIG. 2 on the attached drawings), which blows out a gas against the surface of the film sheet 14 to keep it from drooping. The gas blowing means shown in the publication also has additional functions such as a function for removal of water drops from the surface of the substrate. However, no further description is given here on these functions because such additional functions are irrelevant to the present invention. Japanese Patent Provisional Publication H3-290232 teaches a different type of film sheet-holding means for keeping the rear end of the film sheet from drooping and holding the film sheet in contact with the pressure roller. The film sheet-holding means of the publication is illustrated in FIG. 3 on the attached drawings. The holding means 17 in FIG. 3 adsorbs the rear end of the film sheet on its head and rotates within a certain angle in association with the heated pressure roller 11a. The adsorbing head of the holding means 17 has a number of small openings which communicate vacuum system provided inside of the holding means. The rear end of the film sheet 14 is kept in contact with the head of the holding means and descends in association with the rotation of the heated pressure roller 11a. When the rear end of the film sheet comes to the position near the surface of the substrate, the operation of the vacuum system inside of the holding means 17 is ceased and the rear end of the film sheet is released from the head of the holding means. The holding means 17 then returns to its original position and waits for the next operation.

The present inventors have studied the laminators described in the aforementioned Japanese Patent Provisional Publications H2-196656 and H3-290232 and have found that each of these laminators has a certain problem and requires a certain improvement for practical industrial use.

The film sheet-holding means employed in the laminator of Japanese Patent Provisional Publication H2-196656 (numeral 16 in FIG. 2) which functions to keep the film sheet from drooping and to hold the film sheet in contact with the pressure roller has a merit in that the mechanism is simple. However, this holding means has disadvantage in that it is difficult to keep the film sheet uniformly in contact with the heated surface of the pressure roller. Non-uniform contact of the film sheet with the heated roller surface produces uneven temperature distribution over the film sheet. If the film sheet is a colored photo-sensitive film sheet for preparing a color filter, the uneven temperature produced on the film sheet is apt to produce wrinkles on the film sheet laminated on the substrate.

The film sheet-holding means employed in the laminator of Japanese Patent Provisional Publication H3-290232 (numeral 17 in FIG. 3) which also functions to keep the film sheet from drooping and to hold the film sheet in contact with the pressure roller has merits in that the rear end of the film sheet is securely held and the film sheet is kept uniformly in contact with the heated surface of the pressure roller. However, there is a problem in that the rear end of the film is not in contact with the hearing roller surface in the area adjacent to the position in which the rear end of the film sheet is kept in contact with the adsorbing head of the holding means. Therefore, the temperature of the film sheet becomes lower in the non-contact area than in other area. Therefore, when the film sheet having such temperature unevenness is laminated on a substrate, wrinkles are sometimes produced on the laminated film sheet in the rear end area. There is another problem in the film sheet-holding means of this publication in that the rear end of the film sheet is released when the head of the holding means takes a position near the rear end of the substrate and the film sheet suffers lowering of temperature at its released end.

SUMMARY OF THE INVENTION

The present invention provides an improved laminator for laminating a film sheet on a surface of a substrate which comprises:

a pressure roller;

a conveyor roller for supplying a substrate to the pressure roller;

a film sheet-supplying means which is reciprocally movable up and down for attaching a front end of a continuous flexible film sheet onto the front end of the surface of the substrate which has been moved by the conveyor roller and is stopped in front of the pressure roller; and a film sheet rear end-holding means which is reciprocally movable forward and backward and has on its front end a gas blowing face having a curve essentially corresponding to the curve of the surface of the pressure roller so as to hold the film sheet in contact with the surface of the pressure roller.

PREFERRED MODES OF THE INVENTION

One representative laminator embodying the invention is further described with reference to FIG. 4 and FIG. 5 on the attached drawings, for an embodiment for laminating a photo-sensitive film sheet on a surface of a substrate. The photo-sensitive film sheet generally is in the form of a composite of a support film and a colored photo-sensitive film layer. The free surface of the colored photo-sensitive film is to be attached on the substrate. Another representative laminator of the invention is then described with reference to FIG. 6 and FIG. 7 on the attached drawings.

Figure 4:
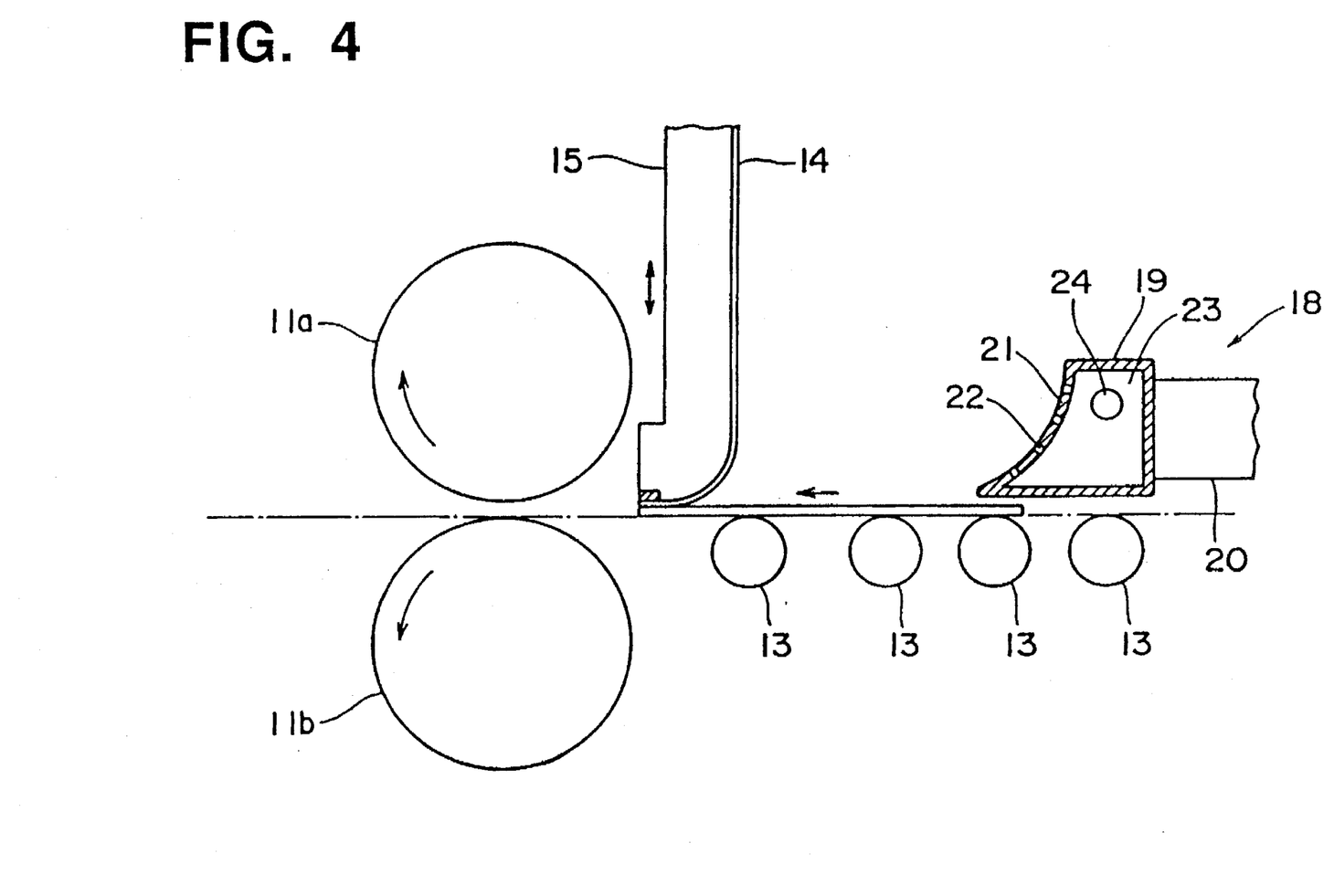
FIG. 4 is a schematic view of one example of a laminator of the invention for laminating a film sheet on a substrate, which is equipped with a film sheet rear end-holding means.

FIG. 4 illustrates the arrangement of the laminator corresponding to that of FIG. 1 which means the initial stage for the lamination of a photo-sensitive film sheet. The laminator comprises a pair of pressure rollers 11a, 11b (which preferably are heated rollers, in that case one pressure roller 11a maybe a heated roller, while another pressure roller 11b is not heated), a plurality of conveyor rollers 13 for supplying a substrate 12 to the pressure rollers 11a, 11b, a film sheet-supplying means 15 which is reciprocally movable up and down for attaching a front end of a continuous flexible film sheet 14 onto the front end of the surface of the substrate 12 (generally, which is beforehand heated to a temperature of 40° to 100° C.) which has been moved by the conveyor rollers 13 and is stopped in front of the pressure rollers. The laminator of FIG. 4 is illustrated only with respect to the main members of the laminator (that is, members directly utilized for the laminating operation) in the same manner as in FIG. 1. The pressure rollers, the conveyor rollers, and the film sheet-supplying means all are provided with auxiliary mechanisms such as driving mechanism, film-cutting mechanism and temporary film-holding mechanisms. Details of these auxiliary mechanisms are described in the aforementioned Japanese Patent Provisional Publications H2-196656 and H3-290232. Accordingly, these auxiliary mechanisms can be provided to the laminator of the present invention. Also known are a variety of means and arts in connection with laminators. Most of these known means and arts are utilizable in combination with the laminator of the invention, if desired.

The film sheet-supplying means 15 of FIG. 4 is so constituted as to form a vacuum system in its body and to be movable up and down in the progress of the laminating procedures.

In FIG. 4, the substrate 12 advances to take a position near the pressure roller 11a, 11b by the driving action provided by the conveyor rollers 13. When the front end of the substrate 12 reaches the predetermined position, the film sheet-supplying means 15 which has been descending with a continuous film sheet 14 attached by the action of the inside vacuum system further descends to attach the front end of the film sheet 14 onto the front end of the surface of the substrate 12. The bottom end of the film sheet-supplying means 15 may be provided with a heater for heating only the narrow area at the front end of the film sheet so as to attach it easily on the substrate.

The laminator of FIG. 4 is provided with a film sheet rear end-holding means 18 for keeping the film sheet from drooping which is a characteristic feature in the invention. The film sheet rear end-holding means 18 has on its front end a gas blowing head 19 and a rod 18 which makes the head 19 move forward and backward reciprocally with respect to the pressure rollers 11a, 11b. The film sheet rear end-holding means moves forward and backward reciprocally in the progress of the laminating operation.

There is no specific limitation with respect to the gas to be blown out from the gas blowing head 19 of the film sheet rear end-holding means 18, so long as it does not react with material of the film sheet. Generally, air is employed. Also preferably employable are inert gases such as argon gas and nitrogen gas and carbon dioxide. If a heated pressure roller is employed as the pressure roller, the gas to be blown out is preferably heated beforehand so that the temperature on the surface of the heated roller (generally, heated to a temperature in the range of 100°150° C. ) on the area receiving the blown-out air can be kept from lowering. The temperature of the heated gas preferably is the same as or somewhat lower than the temperature on the heated roller surface, that is, a temperature of 100° to 150° C.

The gas blowing head 19 is designed to have a curved face 21 for blowing out or emitting a gas which essentially corresponds to the curve of the surface of the pressure roller 11a so as to hold the film sheet uniformly in contact with the surface of the pressure roller. The curve of the curved face 21 can be modified slightly in consideration of the flow of the blown-out gas. The curved face 21 has a number of openings 22 for blowing out a gas therethrough. The size, number, and positions of the openings can be appropriately determined. The head 19 has a space 23 therein for efficiently blowing out a gas. The space 23 communicates with a gas inlet 24 for supplying a gas under pressure into the space 23 from the outside.

When the attachment of the front end of the continuous film sheet to the front end of the substrate is complete, the vacuum system in the film sheet-supplying means 15 is shut down, and the supplying means 15 goes up, leaving the front end of the film sheet on the substrate. In association with the elevation of the film sheet-supplying means 15, the film sheet rear end-holding means 18 advances and stops in the position where the gas blowing-out face 21 on the head 19 is located near the surface of the pressure roller 11a. The operation of blowing out a gas from the face 21 is begun before the holding means 18 is moved or in the course of its advancing movement and keeps the film sheet from drooping after leaving from the film sheet-supplying means 15 and lightly and uniformly pressing it against the surface of the pressure roller 11a, by the pressure of the blown-out gas applied on the middle area or rear end of the film sheet.

The substrate 12 having the front end of the film sheet attached to its front end further advances and passes through a gap between the two pressure rollers 11a, 11b to complete the desired lamination, while the blown-out gas from the holding means 18 is maintaining the film sheet in contact with the pressure roller 11a.

The blown-out of the gas from the face 21 of the head 19 of the film sheet end-holding means 18 is continued and the film sheet advances downward together with the rotating surface of the pressure roller 11a. Therefore, the film sheet is brought into the gap together with the substrate, while it is lightly and uniformly kept in contact with the pressure roller until the rear end of the film sheet passes through the gap and is laminated on the substrate. Accordingly, the desired uniform lamination of the film sheet on the substrate can be accomplished.

The gas blowing out operation from the film sheet rear end-holding means 18 is terminated when the end of the film sheet is laminated on the substrate or around that time, and retreats to take the original position shown in FIG. 4.

Figure 5:
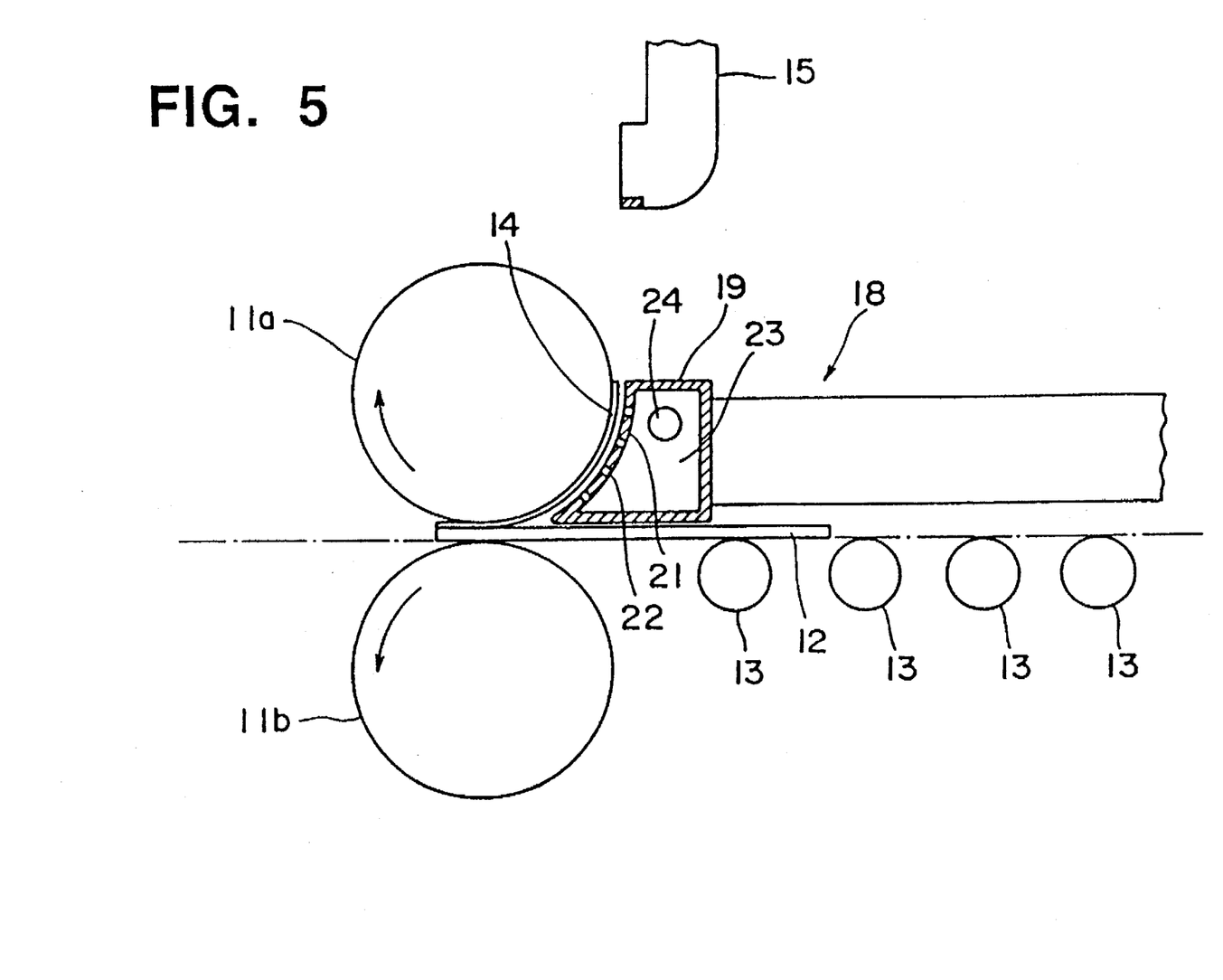
FIG. 5 is a schematic view showing the operation of the laminator of FIG. 4.

In FIG. 4 and FIG. 5, the laminator is designed for laminating a film sheet on one surface of the substrate. However, both surfaces of the substrate can be laminated with a film sheet by providing another set of the laminator units.

Figure 6:
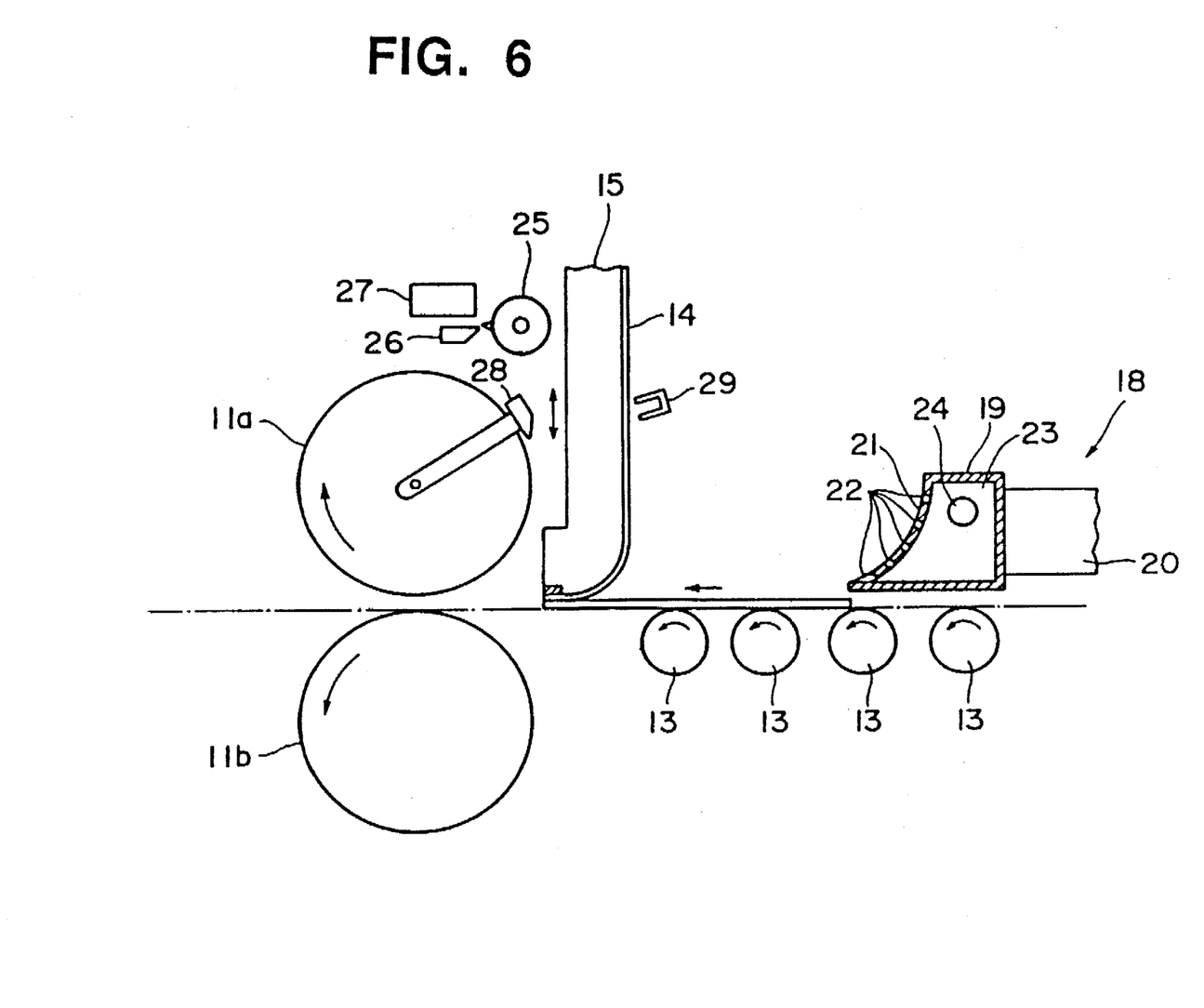
FIG. 6 is a schematic view of another example of a laminator of the invention for laminating a film sheet on a substrate, which is equipped with a film sheet rear end-holding means.
Figure 7:
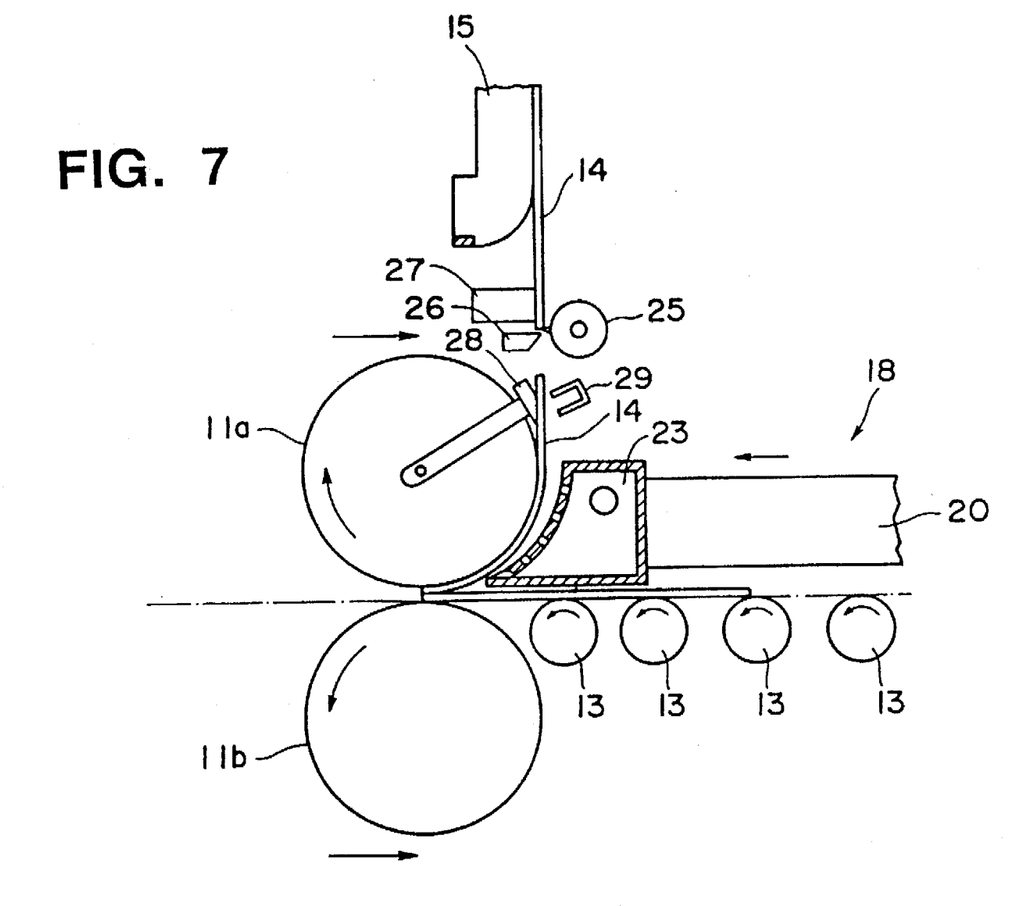
FIG. 7 is a schematic view showing the operation of the laminator of FIG. 6.

Another representative example of the construction of the laminator according to the invention is illustrated in FIG. 6 and FIG. 7 on the attached drawings.

FIG. 6 corresponds to FIG. 4 which illustrates the initial stage of the lamination of the photo-sensitive film sheet on the substrate. The numerals seen in FIG. 6 have the same meanings as those seen in FIG. 4. FIG. 6 further shows a rotary cutter means for cutting the continuous film sheet and auxiliary means to the cutter means. The rotary cutter means comprises a rotary cutter unit 25 and a fixed cutter unit 26 which is arranged in nearly contact with the rotary cutter unit. The rotary cutter unit has a cutter spirally arranged on a cylinder which is rotatable around an axis. The fixed cutter unit has a straight cutter. When the cutter of the rotary cutter unit rotates under the condition of nearly contact with the straight cutter, the continuous film sheet 14 arranged between these cutters is cut in its width direction. Slightly above the rotary cutter means, a continuous film sheet end-holding means 27 for adsorbing and holding the lower end of the continuous film sheet thereon after the film sheet is cut by the rotary cutter means.

The provision of a rotary cutter means as illustrated in FIG. 6 is described in the aforementioned patent publications and already known. A disc cutter or other cutter can be employed in place of the rotary cutter means.

The rotary cutter means is generally arranged to be movable forward and backward and in other directions, possibly, in association with the movement of the pressure rollers. As the film sheet-supplying means 15 is operated to attach the front end of the film sheet onto the front end of the substrate and then goes up, the rotary cutter means approaches the film sheet. When the bottom of the film sheet-supplying means becomes to a level higher than the cutter means, the rotary cutter means catches the continuous film sheet 14 extending from the front end of the substrate to the supplying means between the rotary cutter unit 25 and the straight cutter of the fixed cutter unit 26. The continuous film sheet is then cut in its width direction by the action of the rotary cutter unit, as illustrated in FIG. 7. The lower end of the continuous film sheet is adsorbed and temporarily held by the continuous film sheet end-holding means 27. The temporary holding of the lower end of the continuous film sheet by the holding means 27 is continued until just before the time when the film sheet-supplying means 15 starts to go down and the lower end of the continuous film sheet is adsorbed by and attached to the bottom end of the supplying means 15.

The rear end or its vicinity of the film sheet which has been cut off by the rotary cutter means and whose front end is attached to the front end of the substrate is then adsorbed by and attached to the film sheet end adsorbing means 28 provided to the pressure roller 11a. The film sheet end-adsorbing means 28 is arranged coaxially with the pressure roller 11a. It moves in association with the pressure roller 11a but does not rotates. Therefore, even when the pressure roller 11a rotates, the head of the adsorbing means 28 is kept at the same level. The head of the adsorbing means 28 is covered with a material having a low friction coefficient such as a fluororesin and is provided with a number of small openings. Inside of the adsorbing means 28 is connected with a vacuum chamber (not illustrated), and the openings communicate with the vacuum chamber in the adsorbing means 28. Therefore, the adsorbing means 28 can hold lightly on its head the film sheet by the action of the vacuum system. The head of the adsorbing means 28 can be heated or cooled to adjust the temperature of the film sheet held thereon, if desired. The holding of the film sheet on the head by adsorption can be begun before the film sheet is cut by means of the rotary cutter means, or simultaneously with or just after the cutting operation of the film sheet. The adsorption for the film sheet holding can be begun in association with the beginning of the lamination of the film sheet on the substrate surface. Otherwise, the adsorption can be begun just before or after the beginning of the laminating operation.

The film sheet end-adsorbing means 28 may have an auxiliary means 29 for assisting the holding of the film sheet by the adsorbing means 28, as is illustrated in FIG. 6 and FIG. 7. The auxiliary means 29 has an opening to blow out a gas against the film sheet. Accordingly, the auxiliary means 29 is arranged to cause the opening to face the adsorbing head of the film sheet end-adsorbing means. The gas to be blown out generally is air and may be heated, for instance, up to approximately 40° C. (or may be higher) or cooled. The temperature, amount, and/or flow rate of the gas to be blown out from the opening of the auxiliary means 29 can be controlled to adjust the surface characteristics (e.g., viscosity) of the surface layer of the film sheet on the side to be placed on the substrate. Therefore, such controlling of the gas flow conditions can be favorably utilized to laminate the film sheet on the substrate more uniformly. The opening (such as in the form of a nozzle) of the auxiliary means 29 can be in the form of a slit or can comprise a number of small pores aligned along the width direction of the film sheet.

The laminator of FIG. 6 has the film sheet end-holding means 18 (for keeping the rear end of the cut-off film sheet from drooping) which is the principal characteristic feature of the invention. This means serves to keep the cut-off film sheet in contact with the pressure roller by the action of the blown-out gas, as is explained for the laminator illustrated in FIG. 4 and FIG. 5. However, since the laminator of FIG. 6 has the additional film sheet end-adsorbing means 28 for temporarily holding the film, the film sheet rear end-holding means 18 maybe operated after the rear end of the cut-off film sheet is released from the adsorbing means 28.

When the attachment of the front end of the film sheet onto the front end of the substrate is complete, the inside vacuum system of the film sheet-supplying means (i.e., supplier) 15 is released and the film sheet-supplying means 15 goes up. In association with the upward movement of the film sheet-supplying means 15, a pair of pressure rollers 11a, 11b which are always rotating as well as the film sheet end-adsorbing means 28 together advance to approach the substrate 12 and stops near the position where the gas blowing-out face 21 of the head 19 of the film sheet rear end-holding means 18 is stopped., as is illustrated in FIG. 7. A pair of the pressure rollers 11a, 11b comprise a clamp (not shown) which functions to move the pair of the pressure rollers to open or close the gap between the rollers for receiving the substrate in the gap. The central point of the clamp is arranged to position at the same level as the central point of the substrate in the depth direction. Since the pressure rollers 11a, 11b rotate in the direction indicated by the arrows in FIG. 7, the substrate advances and passes through the gap between the rotating rollers. In the course of the passage of the substrate through the gap, the photo-sensitive film sheet is uniformly laminated on the surface of the substrate.

In the course of advancing movement of the substrate, the cut-off film sheet slides down in contact with the head of the film sheet end-adsorbing means 28 under weak adsorption. At least just before the time when the rear end of the cut-off film sheet slides down beyond the head, a gas is begun to be blown out from the openings 22 of the film sheet rear end-holding means 18. The blown-out gas lightly and uniformly pushes the rear end of the film sheet which leaves the head of the adsorbing means 28 and just droops downward onto the surface of the pressure roller 11a. At that time, the adsorptive action by the adsorbing means 28 is terminated.

The gas blowing out operation from the film sheet rear end-holding means 18 is terminated when the end of the film sheet is laminated on the substrate or around that time, and retreats to take the original position shown in FIG. 6.

In FIG. 6 and FIG. 7, the laminator is designed for laminating a film sheet on one surface of the substrate. However, both surfaces of the substrate can be laminated with a film sheet by providing another set of the laminator units.

The laminator of the invention has been explained above in the operation for laminating a photo-sensitive film sheet on a substrate. However, it is apparent that a flexible or low self-supporting film sheet other than the photo-sensitive film sheet for the preparation of a color filter can be laminated on a substrate on one or both sides using the laminator of the invention.

As is explained above, the laminator of the invention enables to keep the cut-off film sheet in uniform contact with the pressure roller by the action of gas which is emitted by the curved surface having a curve which is the same as or similar to the curve of the outer wall of the pressure roller. Further, since the gas can be continuously applied onto the film sheet in contact with the pressure roller almost until the rear end of the film sheet is laminated on the rear end of the substrate, non-uniform lamination such as production of wrinkle on the surface of the laminated film sheet is effectively obviated.

Moreover, if the film sheet end-adsorbing means 28 is provided to the laminator in addition to the film sheet rear end-holding means 18 which is edible to blow out a gas against to the film sheet, and the contact of the film sheet onto the pressure roller is accomplished by the film sheet end-adsorbing means in the initial stage and then by the film sheet rear end-holding means in the final stage, the uniformness of the surface of the film sheet laminated on the substrate is more improved.

What is claimed is:

1. A laminator for laminating a film sheet on a surface of a substrate which comprises:

a pressure roller;

a conveyor roller for supplying a substrate to the pressure roller;

a film sheet-supplying means which is reciprocally movable up and down for attaching a front end of a continuous flexible film sheet onto the front end of the surface of the substrate which has been moved by the conveyor roller and is stopped in front of the pressure roller; and a film sheet end-holding means which is reciprocally movable forward and backward and has on its front end a gas blowing face having a curve essentially corresponding to the curve of the surface of the pressure roller so as to hold the film sheet in contact with the surface of the pressure roller.

2. The laminator of claim 1, wherein the pressure roller is a heated pressure roller.

3. The laminator of claim 1, wherein the pressure roller consists of a pair of pressure roller units which are movable together forward under rotation to the position of the front end of the substrate to which the front end of the film sheet is attached, and in combination receive the substrate with the films sheet and cause to advance the substrate by their rotation.

4. The laminator of claim 1, which further comprises a cutter means for cutting the continuous film sheet in its width direction which extends from the front end of the substrate to the film sheet-supplying means going up after the front end of the film sheet is attached to the front end of the surface of the substrate.

5. The laminator of claim 1, which further comprises a cutter means for cutting the continuous film sheet in its width direction which extends from the front end of the substrate to the film sheet-supplying means going up after the front end of the film sheet is attached to the front end of the surface of the substrate and a film sheet end-adsorbing means having an adsorbing head to keep the end of the film sheet having been cut off on the surface of the pressure roller.

* * * * *